March 22, 1955  J. F. BYRNE  2,704,805

FREQUENCY ANALYZER CIRCUIT

Filed March 4, 1946

INVENTOR
JOHN F. BYRNE

BY

*William D. Hall*

ATTORNEY

United States Patent Office 2,704,805
Patented Mar. 22, 1955

2,704,805

FREQUENCY ANALYZER CIRCUIT

John F. Byrne, Oyster Bay, N. Y., assignor to the United States of America as represented by the Secretary of War Application March 4, 1946, Serial No. 651,934

2 Claims. (Cl. 250—20)

This invention relates generally to electrical circuits and more particularly to a frequency analyzer for determining the carrier frequencies of pulsed R.-F. signals.

It is frequently desirable to determine the frequency of a radio signal which is being received. One system of accomplishing this determination makes use of a selective receiver, the frequency of which is periodically varied over a selected range. Signals received may be applied to a plurality of frequency selective circuits, and the resulting outputs may be utilized to present on the screen of a cathode ray tube or other indicator an indication of the respective frequencies of the various signals being received. For reception of a pulsed signal to occur, it is necessary for a pulse to be received at a time when the receiver is receptive to signals of the particular radio frequency of which the pulse is composed. This requirement limits the number of pulses actually passed by a receiver in this type of system. Furthermore, if the pulses are transmitted in a directive beam, reception takes place only when the beam is directed at or near the receiver, which further limits the total number of pulses available for reception.

It is an object of the present invention, therefore, to provide a means for determining the frequency of a pulsed radio-frequency signal notwithstanding the above-mentioned difficulties. It is a further object to design this means so that a visual indication is produced from which the respective frequencies of the received signals may be read directly.

In general the invention comprises a broad-band radio receiver, the bandwidth of which is sufficient to cover the entire frequency range to be searched, and a number of discriminators, the outputs of which are combined in such a way as to produce an indication of signal frequency on a cathode ray tube screen.

Other objects, features and advantages of this invention will suggest themselves to those skilled in the art and will become apparent from the following description of the invention taken in connection with the accompanying drawing in which.

Figure 1:
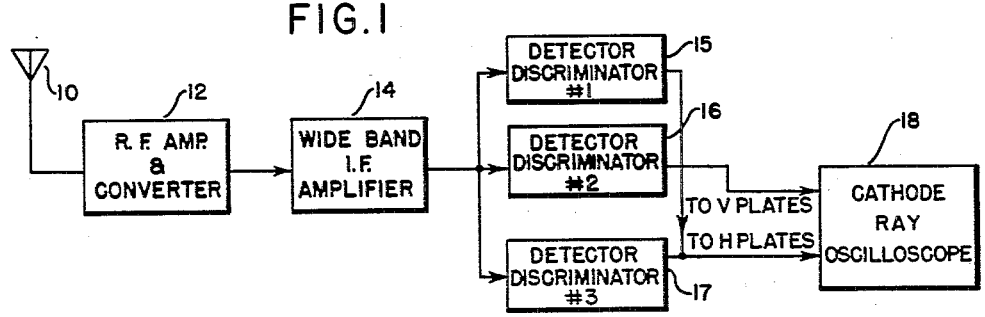
Fig. 1 is a block diagram of one embodiment of the invention.

Reference is made now more particularly to Fig. 1, which shows an antenna 10, the output of which is applied to a conventional R.-F. amplifier and converter 12. The frequency response of the amplifier and converter should be sufficiently broad so that, in combination with the I.-F. amplifier 14, to which its output is applied, the overall effective frequency range includes the entire band of frequencies to be searched. This requires that the I.-F. amplifier 14 also have a broad bandwith. The aforesaid converter is understood to include a local oscillator circuit as well as a mixer or converter circuit.

The output of amplifier 14 is applied in parallel to three detector-discriminators 15, 16 and 17. The discriminator portions of these circuits may consist of any frequency selective circuits having a single-peaked frequency response characteristic. For example, parallel tuned circuits may be used, or if further amplification is desired, single or double-tuned I.-F. amplifiers may be employed. The bandwidths of these tuned circuits or R.-F. amplifiers should be considerably narrower than that of amplifier 14, and the center frequencies thereof should be staggered according to a pattern which will be explained later. The detector portions of detector-discriminators 15, 16 and 17 may consist of conventional diode detectors to which the output voltages of the frequency selective circuits are respectively applied in such a manner that the output voltages of two of the discriminator-detectors, for example 15 and 16, are positive, while the output voltage of the other is negative. The voltages produced by detector-discriminators 15 and 17 are combined, for example, by means of a resistor coupling between the output terminals, and applied to the horizontal deflection plates of a cathode ray oscilloscope 18, while the voltage produced by detector-discriminator 16 is applied to the vertical deflection plates thereof. It will be understood that an oscilloscope having deflection coils rather than plates could be utilized if desired.

Figure 2:
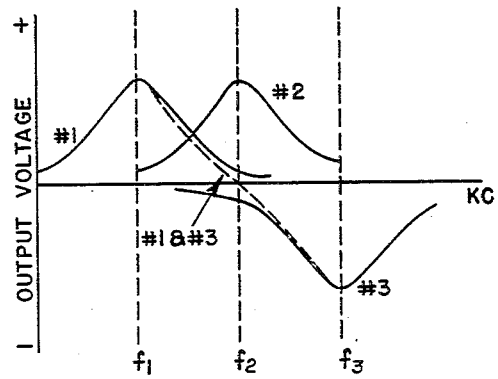
Fig. 2 is a series of curves showing the respective frequency responses of the discriminators of Fig. 1.
Figure 3:
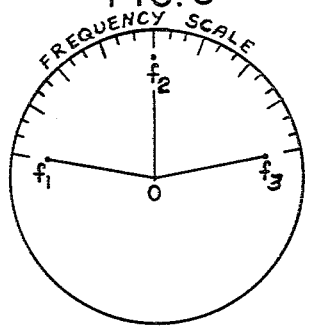
Fig. 3 is a diagram of a typical indication on the indicator screen of the cathode ray oscilloscope of Fig. 1.

The operation of the apparatus shown in Fig. 1 may be seen more clearly by reference to Figs. 2 and 3. Fig. 2 shows the output voltages of the three detector-discriminators 15, 16 and 17 plotted as functions of frequency. As may be seen, the output voltages of detector-discriminators 15 and 17 are positive and negative respectively, and the center frequencies of these circuits are separated by such an amount that the curves overlap only slightly. The output voltage of detector-discriminator 16 is positive, and its center frequency is approximately midway between the center frequencies of the other two circuits. Since the output voltages of detector-discriminators 15 and 17 are combined, a resultant response curve showing the voltage produced by the combination as a function of frequency is also indicated by the dotted curve in Fig. 2. The voltages indicated by this dotted curve are thus the resultant voltages applied to the horizontal deflection plates of cathode ray oscilloscope 18 for various frequencies.

It may first be assumed that a series of pulses is received having a carrier frequency $f_1$ corresponding approximately to the center frequency of detector-discriminator 15. During each pulse a rather large positive voltage will be applied to the horizontal deflection plates of cathode ray oscilloscope 18, while a small positive voltage will be applied to the vertical deflection plates. Assuming that positive voltages on the horizontal and vertical deflection plates cause deflections of the electron beam to the left and upward, respectively, the spot on the screen of the cathode ray tube will be deflected from its quiescent position at 0 to the point marked $f_1$ in Fig. 3. Similarly a series of pulses of carrier frequency $f_3$ corresponding to the center frequency of detector-discriminator 17 will produce rather large negative voltages on the horizontal deflection plates and small positive voltages on the vertical deflection plates, and the spot will be deflected from 0 to the point marked $f_3$ in Fig. 3. A series of pulses of carrier frequency $f_2$ corresponding to the center frequency of detector-discriminator 16 may be seen to deflect the spot to the point marked $f_2$ by a similar analysis.

Since each pulse will deflect the spot to the point mentioned, a series of pulses will produce a trace indicative of the periodic motion of the spot between its quiescent and deflected positions. Such a trace appears as a luminous line extending from the center of the screen to a point near the circumference thereof, like the spoke of a wheel. This is illustrated in Fig. 3 by the lines joining 0 to $f_1$, $f_2$ and $f_3$, respectively. A definite relation is thus seen to exist between the carrier frequency of the received signal, and the angular position of the trace formed. By a suitable calibration the carrier frequency may then be read directly by noting the position of the trace with respect to a scale marked on the circumference of the cathode ray tube face as shown in Fig. 3.

The present system is uniquely adapted to the analysis of pulsed signals, inasmuch as the radial trace indicative of a signal may be produced even though the pulses occur at relatively long intervals. The probability of error caused by coincidence of two or more pulses from different sources is light, due to the short duration of the pulse relative to the pulse repetition period. In addition, by causing the system to be continually receptive to any signals within the frequency band, the number of pulses received is made a maximum.

It will be further obvious that a different number or type of discriminator-detectors might be used and different combinations of the output voltages of these circuits might be made in order to accomplish similar results.

While there has been described what is at present considered to be the preferred embodiment of this invention, it will be obvious to those skilled in the art that various changes and modifications may be made therein without departing from the scope of the invention.

The invention claimed is:

1. In combination, receiving means for receiving pulsed radio-frequency signals and for deriving therefrom pulsed intermediate-frequency signals, a wide-band intermediate frequency amplifier coupled to the output of said receiving means, first, second and third signal translating means coupled to the output of said amplifier, each comprising a frequency selective circuit coupled to a detector circuit, the respective center frequencies of said frequency selective circuits differing by given amounts, said first and second signal translating means producing output voltages of a given polarity and said third signal translating means producing an output voltage of the opposite polarity, a cathode ray oscilloscope, means for applying the combined output voltages of said first and third signal translating means to the horizontal beam deflecting means of said cathode ray oscilloscope, and means for applying the output voltage of the other of said signal translating means to the vertical beam deflecting means of said cathode ray oscilloscope.

2. In combination, receiving means for receiving pulsed radio-frequency signals and for deriving therefrom pulsed intermediated frequency signals, a wide-band intermediate-frequency amplifier coupled to the output of said receiving means, first, second, and third frequency selective circuits coupled to the output of said amplifier for deriving from said pulsed intermediate frequency signals respective output voltages, each of said frequency selective circuits being tuned to a different intermediate frequency within said band, a cathode ray oscilloscope, means for applying the combined output voltages of two of said frequency selective circuits to the horizontal beam deflecting means of said cathode ray oscilloscope, and means for applying the output voltage of the third of said frequency selective circuits to the vertical beam deflecting means of said cathode ray oscilloscope.

References Cited in the file of this patent

UNITED STATES PATENTS

| Number | Name | Date |
|---|---|---|
| 1,831,881 | Potter | Nov. 17, 1931 |
| 2,178,074 | Jakel | Oct. 31, 1939 |
| 2,189,848 | Wheeler | Feb. 13, 1940 |
| 2,194,516 | Anderson | Mar. 26, 1940 |
| 2,215,197 | Sherman | Sept. 17, 1940 |
| 2,269,126 | Pieracci | Jan. 6, 1942 |
| 2,354,827 | Peterson | Aug. 1, 1944 |
| 2,387,685 | Sanders | Oct. 23, 1945 |
| 2,404,501 | Kear | July 23, 1946 |
| 2,408,742 | Eaton | Oct. 8, 1946 |
| 2,409,462 | Zworykin et al. | Oct. 15, 1946 |